United States Patent
Harada et al.

(10) Patent No.: US 12,445,322 B2
(45) Date of Patent: Oct. 14, 2025

(54) VEHICLE COMMUNICATION SYSTEM

(71) Applicant: SUBARU CORPORATION, Tokyo (JP)

(72) Inventors: Masaaki Harada, Tokyo (JP); Daisuke Ito, Tokyo (JP); Toru Nameki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 173 days.

(21) Appl. No.: 18/067,418

(22) Filed: Dec. 16, 2022

(65) Prior Publication Data
US 2023/0231738 A1    Jul. 20, 2023

(30) Foreign Application Priority Data

Jan. 20, 2022  (JP) ................................ 2022-007277

(51) Int. Cl.
*H04L 12/40*    (2006.01)

(52) U.S. Cl.
CPC .............. *H04L 12/40039* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 10,379,874 B1 * | 8/2019 | Venkatasamy | G06F 1/3212 |
| 10,894,524 B1 * | 1/2021 | Luo | G08B 21/24 |
| 2012/0233478 A1 * | 9/2012 | Mucignat | H04W 52/0277 713/320 |
| 2018/0057008 A1 * | 3/2018 | Utagawa | B60W 30/18109 |
| 2020/0312051 A1 * | 10/2020 | Nishikawa | G07C 5/0841 |

FOREIGN PATENT DOCUMENTS

| | | |
|---|---|---|
| JP | 2015-154189 A | 8/2015 |
| JP | 2015-199444 A | 11/2015 |

OTHER PUBLICATIONS

Office Action dated Aug. 8, 2025, issued in corresponding Japanese patent application No. 2022-007277, 7 pages.

\* cited by examiner

*Primary Examiner* — Paul Yen
(74) *Attorney, Agent, or Firm* — Rimon P.C.

(57) ABSTRACT

A vehicle communication system includes a gateway device. The gateway device is configured to receive electric power from a battery of a vehicle, relay communication among multiple communication lines coupled to respective electronic control units, perform, when receiving a signal through any of the communication lines, a sleep wake-up operation by transmitting a wake-up request signal to switch one or more of the electronic control units to be woken up from a sleep mode to a wake-up mode, and refrain from transmitting the wake-up request signal in a case where the gateway device determines in view of electric power consumption of the battery that transmission of the wake-up request signal is unacceptable.

20 Claims, 4 Drawing Sheets

VEHICLE COMMUNICATION SYSTEM

CROSS-REFERENCE TO RELATED APPLICATIONS

The present application claims priority from Japanese Patent Application No. 2022-007277 filed on Jan. 20, 2022, the entire contents of which are hereby incorporated by reference.

BACKGROUND

The disclosure relates to a vehicle communication system.

The vehicle communication system includes multiple electronic control units (ECUs) that are communicably coupled to each other via an in-vehicle network using a communication protocol such as a controller area network (CAN). The in-vehicle network generally includes a gateway device that relays data. The gateway device is, for example, a central gateway (CGW) ECU. The multiple ECUs perform data transmission among different communication lines (communication buses) coupled to the gateway device.

A vehicle communication system is known which performs a sleep wake-up operation to reduce unnecessary electric power consumption when the vehicle is not in use. According to the system, the gateway device wakes up itself when receiving a wake-up request signal from a specific ECU via a corresponding communication line, and thereafter distributes the wake-up request signal to ECUs to be woken up. The ECUs to be woken up are each thereby switched from a sleep mode in which electric power consumption is reduced to an ordinary mode (a wake-up mode) in which data communication is executable.

In the known system, when receiving the wake-up request signal, the gateway device stores the data on the wake-up request signal in a memory and thereafter switches to the wake-up mode. Thereafter, the gateway device reads the data from the memory and transmits the data to a microprocessor unit (MPU) of the gateway device. The MPU analyzes the received data and determines whether the data is proper. Reference is made to Japanese Unexamined Patent Application Publication (JP-A) No. 2015-199444, for example.

SUMMARY

An aspect of the disclosure provides a vehicle communication system including a gateway device. The gateway device is configured to receive electric power from a battery of a vehicle, relay communication among multiple communication lines coupled to respective electronic control units, perform, when receiving a signal through any of the communication lines, a sleep wake-up operation by transmitting a wake-up request signal to switch one or more of the electronic control units to be woken up from a sleep mode to a wake-up mode, and refrain from transmitting the wake-up request signal in a case where the gateway device determines in view of electric power consumption of the battery that transmission of the wake-up request signal is unacceptable.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
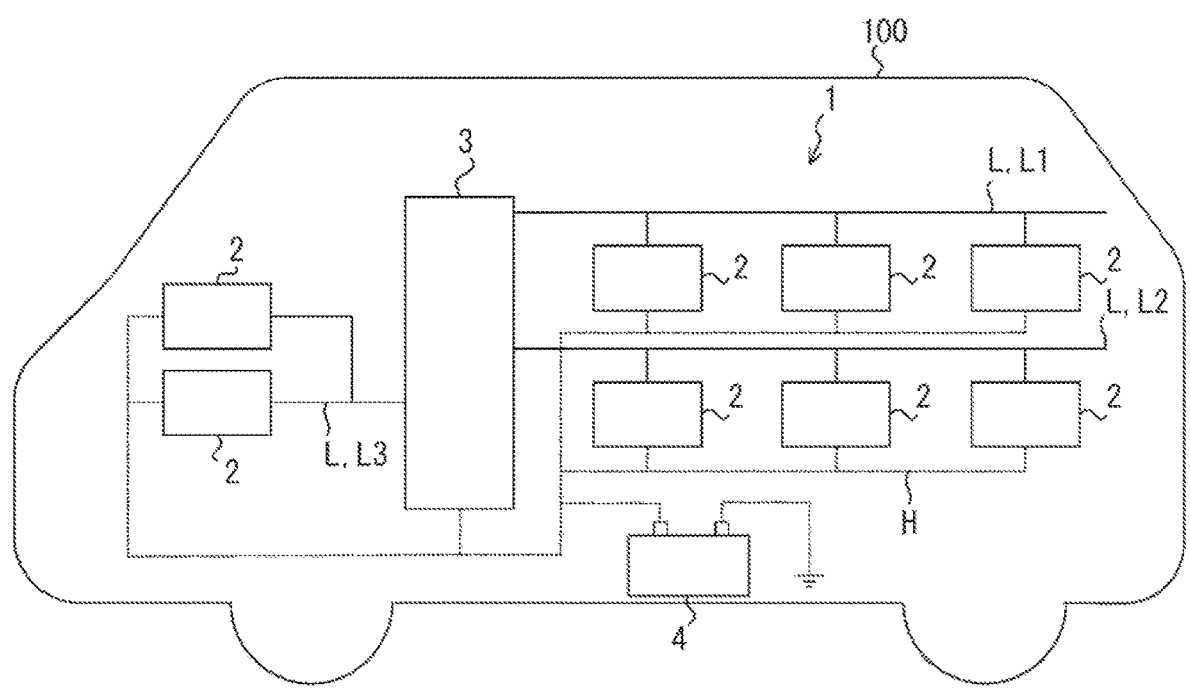
FIG. 1 is a block diagram of a vehicle communication system according to one example embodiment of the disclosure.

A gateway device according to the technique disclosed in JP-A No. 2015-199444 determines whether a wake-up request signal received from an ECU is proper using data analysis. In a case where the it is determined that the wake-up request signal is proper, the gateway device distributes the wake-up request signal received from the ECU to all of the other ECUs involved. Each of the ECUs receiving the wake-up request signal switches from a sleep mode to a wake-up mode.

According to the technique disclosed in JP-A No. 2015-199444, even though it is determined that the data of the wake-up request signal is proper as a result of the data analysis, a situation may arises in which the wake-up request signal is continuously sent from a specific ECU over a long period of time depending on a state of an in-vehicle device or a state of an operation performed by an operator using an operation device. If such a situation arises when the vehicle is not in use and thus the battery is not charged, the battery becomes greatly exhausted, which adversely effects on activation of the vehicle.

Further, according the above-described technique disclosed in JP-A No. 2015-199444, the gateway device determines whether the wake-up request signal is proper by analyzing data received by the gateway device. However, such data analysis involves a high processing capacity of the gateway device, which results in an unavoidable increase in cost of the system.

It is desirable to provide a vehicle communication system that makes it possible to perform a sleep wake-up operation to reduce unnecessary electric power consumption without excessively increasing the processing capacity of the gateway device even if a situation arises in which a wake-up request signal is continuously transmitted from an ECU.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale.

Throughout the present specification and the drawings, elements having substantially the same function and configuration are denoted with the same reference numerals to avoid any redundant description. In addition, elements that are not directly related to any embodiment of the disclosure are unillustrated in the drawings.

As illustrated in FIG. 1, a vehicle communication system 1 to be mounted on a vehicle 100 includes multiple ECUs 2. The ECUs 2 are communicably coupled to each other via multiple communication lines L (L1 to L3). In this example, the communication lines L may each be a controller area network (CAN) communication bus (a so-called CAN bus). However, the communication lines L are not limited to this example and may be communication lines of another type.

The vehicle communication system 1 includes a gateway device 3 that relays communication between the multiple communication lines L. For example, the gateway device 3 may be a central gateway (CGW) ECU. The multiple communication lines L are coupled to the gateway device 3. The ECUs 2 coupled to the different communication lines L may be communicable with each other via the gateway device 3.

The different communication lines L (L1 to L3) coupled to the gateway device 3 may construct respective local area networks (LANs) having different communication systems. Examples of the LANs may include a traveling control system LAN, a body system LAN, and a multimedia system LAN. The traveling control system LAN may perform stabilizing control of vehicle behaviors, engine control, or air-conditioning control. The body system LAN may perform control of a door lock, a seat operation, or a power window. The multimedia system LAN may control an audio system or a navigation system. The communication systems may each include one or more ECUs 2 coupled to corresponding one of the communication lines L. The vehicle communication system 1 may use a battery 4 of the vehicle 100 as a power source. The ECUs 2 and the gateway device 3 described above may be coupled to the battery 4 via an electric supply line H.

Figure 2:
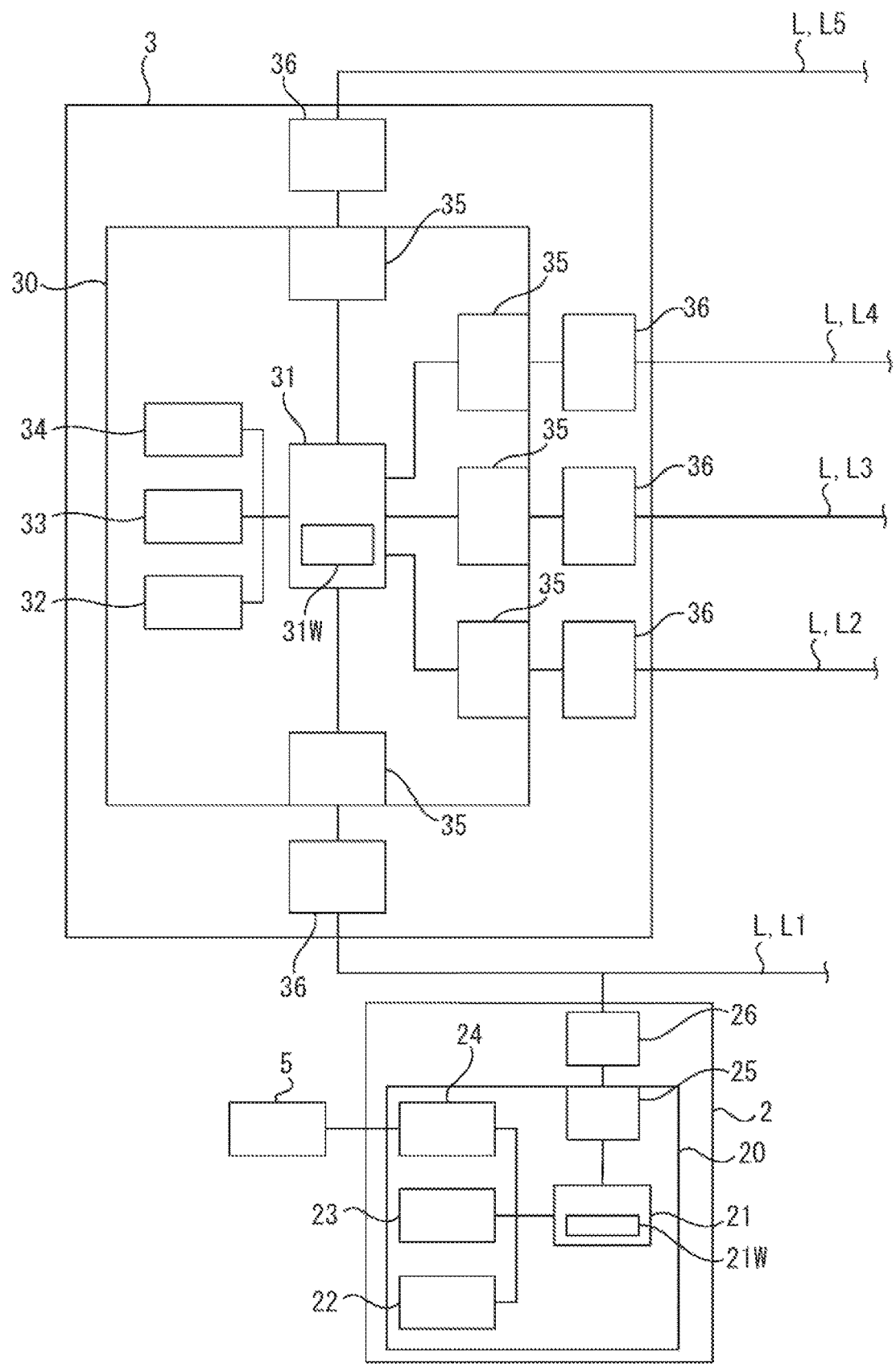
FIG. 2 is a block diagram of an exemplary hardware configuration of the vehicle communication system according to one example embodiment of the disclosure.

As illustrated in FIG. 2, each of the ECUs 2 may include a microcontroller 20 as hardware. The microcontroller 20 may include a central processing unit (CPU) 21, a read only memory (ROM) 22, a random access memory (RAM) 23, an external interface (I/F) 24, and a communication circuit 25. The communication circuit 25 of the microcontroller 20 may be coupled to the communication line L via a communication transceiver 26.

The CPU 21 may execute various programs stored in the ROM 22 to cause the above-described LANs to achieve various types of control. The ROM 22 may be a non-volatile memory. For example, the ROM 22 may store programs to be executed by the CPU 21 and data necessary for the CPU 21 to execute the programs, for example. The RAM 23 may be a main memory such as a dynamic random access memory (DRAM) or a static random access memory (SRAM). For example, the RAM 23 may serve as a working area used by the CPU 21 to execute the program. The external I/F 24 may control data transmission to/from an external device. An on-board device 5 of various types may be coupled to the ECU 2 via the external I/F 24.

As in the case with the ECU 2, the gateway device 3 may include a microcontroller 30. The microcontroller 30 may include a CPU 31, a ROM 32, a RAM 33, an external I/F 34, and multiple communication circuits 35. The multiple communication circuits 35 of the microcontroller 30 in the gateway device 3 may be coupled to the respective communication lines L (L1 to L5) via respective communication transceivers 36.

To suppress exhaustion of the battery 4, the vehicle communication system 1 performs a sleep wake-up operation when the vehicle 100 is not used. In the sleep wake-up operation, a reduced amount of electric power may be supplied from the battery 4 to the ECUs 2, the gateway device 3, and another component. To execute the sleep wake-up operation, the CPU 21 of the ECU 2 may include a wake-up request transmitter 21W as a software configuration, and the CPU 31 of the gateway device 3 may include a wake-up request relay 31W as a software configuration.

Figure 3:
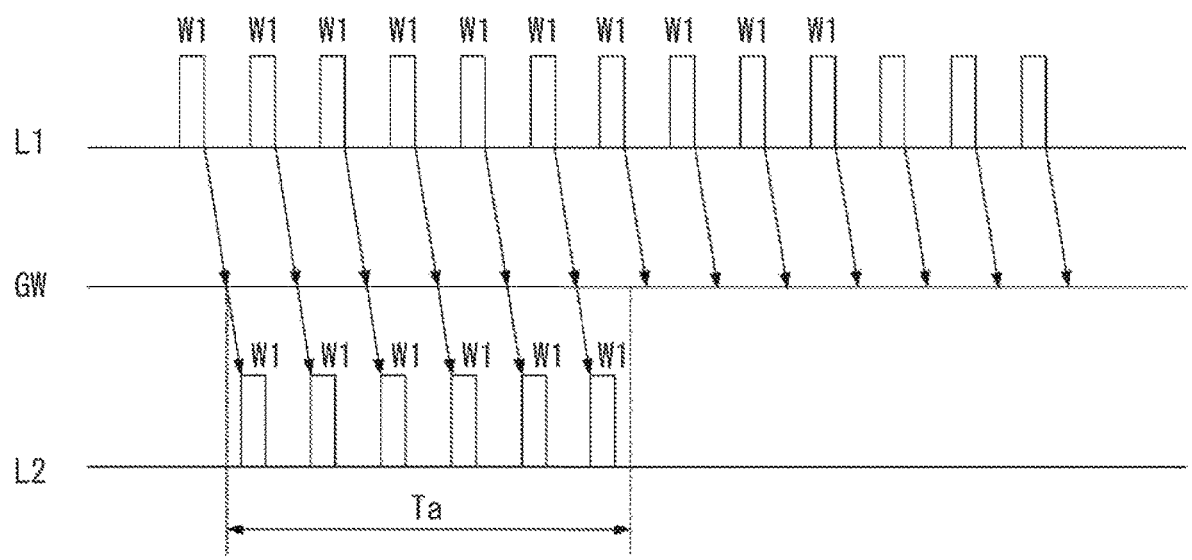
FIG. 3 is a chart illustrating an exemplary operation of a wake-up request relay according to one example embodiment of the disclosure.

The wake-up request transmitter 21W in each of the ECUs 2 may transmit a wake-up request signal W1 in response to a signal from the on-board device 5 coupled to the ECU 2. The wake-up request signal W1 transmitted from the ECU 2 may be sent to the gateway device 3 through the communication line L (e.g., the communication line L1), as illustrated in FIG. 3.

When receiving the wake-up request signal W1, the wake-up request relay 31W in the gateway device 3 may perform a relay operation. As the relay operation, the wake-up request relay 31W may identify the communication line L of the ECU 2 to be woken up by the wake-up request signal W1, and may transmit the wake-up request signal W1 to the identified communication line L (e.g., the communication line L2), as illustrated in FIG. 3. Alternatively, the wake-up request relay 31W may transmit the wake-up request signal W1 to all of the communication lines L.

The gateway device 3 may wake up itself in response to not only the wake-up request signal W1 sent from one of the ECUs 2 but also a signal of any type (e.g., a CAN signal) sent through any of the communication lines L, and may transmit the wake-up request signal W1 to the ECU 2 to be woken up.

Figure 4:
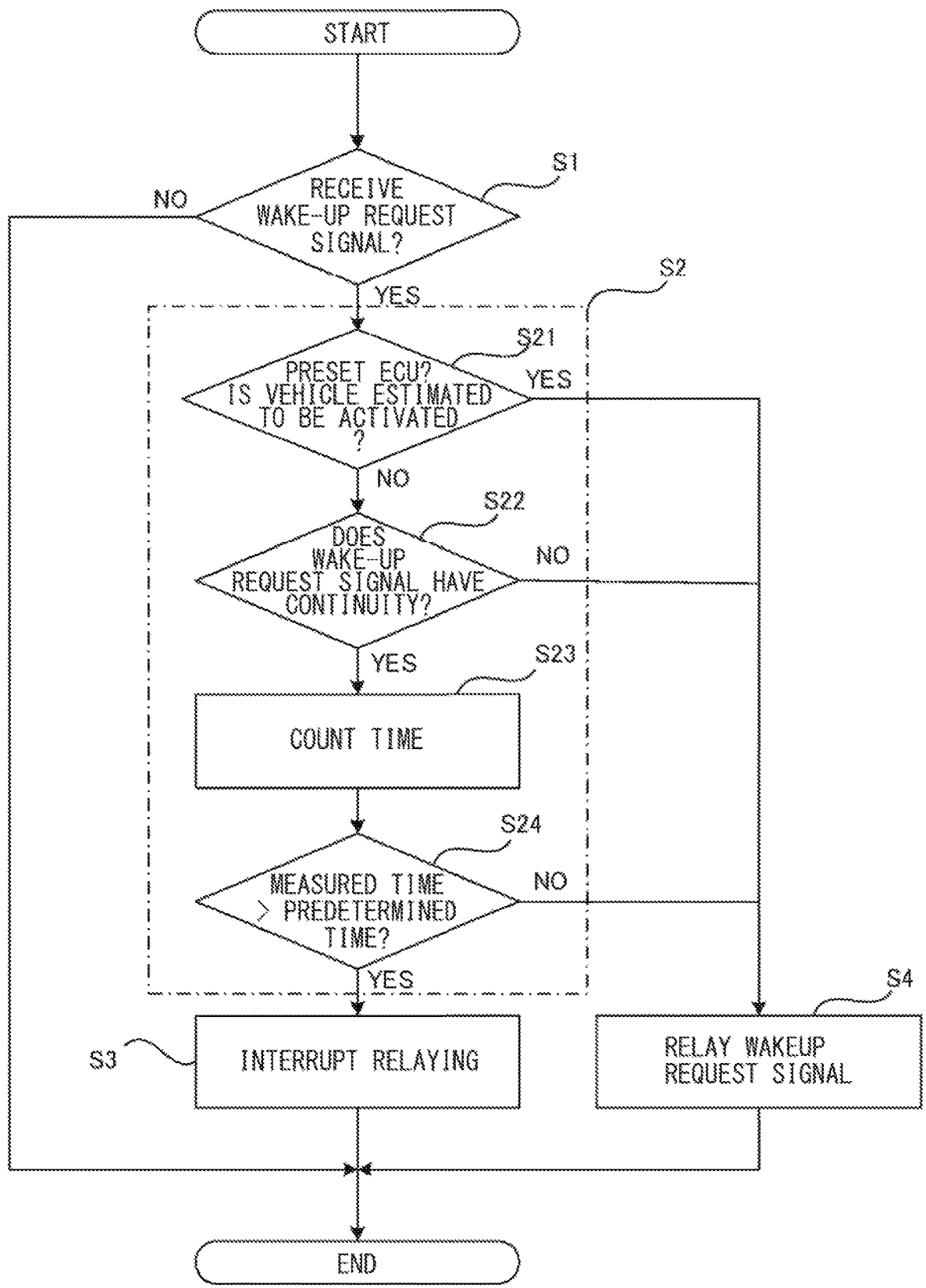
FIG. 4 is a flowchart of an exemplary process to be performed by the wake-up request relay.

In one example, if it is determined that a predetermined condition is satisfied through a process illustrated in FIG. 4, the gateway device 3 refrains from transmitting the wake-up request signal W1. For example, the gateway device 3 interrupts the transmission of the wake-up request signal W1.

Described below is an example in which the gateway device 3 relays the wake-up request signal W1 transmitted from one of the ECUs 2 to another one of the ECUs 2.

As illustrated in FIG. 4, the wake-up request relay 31W may determine whether the wake-up request signal W1 has been received (Step S1). If it is not determined that the wake-up request signal W1 has been received (Step S1: NO), the wake-up request relay 31W may switch to a stand-by mode. If it is determined that the wake-up request signal W1 has been received (Step S1: YES), the wake-up request relay 31W may execute a series of processes S2. If it is determined through the series of processes S2 in view of the electric power consumption of the battery 4 that the transmission of the wake-up request signal W1 is unacceptable, the wake-up request relay 31W refrains from transmitting the wake-up request signal W1 (Step S3). For example, the wake-up request relay 31W may interrupt the currently maintained relaying of the wake-up request signal W1 from one of the communication lines L (e.g., the communication line L1) to another one of the communication lines L (e.g., the communication line L2).

An example of the series of processes S2 is described in detail below. When receiving the wake-up request signal W1 (Step S1: YES), the gateway device 3 may identify the ECU 2 that has transmitted the wake-up request signal W1, and may determine whether the identified ECU 2 is a preset ECU 2 (Step S21). If the wake-up request signal W1 is a signal transmitted from the preset ECU 2 (Step S21: YES), the gateway device 3 may perform an ordinary process, that is, a process to relay the wake-up request signal W1 (Step S4).

One example of the preset ECU 2 may be an ECU that transmits the wake-up request signal W1 to activate the vehicle 100. For example, the preset ECU 2 may correspond to an ECU that transmits the wake-up request signal W1 when a vehicle start switch (e.g., an ignition switch) is turned on, an ECU that transmits the wake-up request signal W1 when the driver door is opened, or an ECU that transmits the wake-up request signal W1 when detecting an occupant seated in the driver's seat.

In Step S21, it may be determined whether the vehicle 100 is estimated to be activated. If the vehicle 100 is estimated to be activated, the battery 4 may be estimated to start being charged with the activation of the vehicle 100. Thus, there may be a low risk of running out of the battery 4. Accordingly, if it is determined in Step S21 that the vehicle 100 is estimated to be activated (Step S21: YES), the process may proceed to Step S4 in which the wake-up request signal W1 is transmitted without performing determinations in Steps S22 and S24 and without interrupting the relaying of the wake-up request signal W1.

Another example of the ECU 2 to be determined as the preset ECU 2 in Step S21 may be an ECU that operates when a specific important operation is performed by the driver who drives the vehicle 100. In this case, it may be determined that the relay should not be interrupted in view of driver's convenience, for example, and the process may proceed to Step S4 in which the wake-up request signal W1 is transmitted without performing the determinations in Steps S22 and S24 and without interrupting the relaying of the wake-up request signal W1. In this case, if the relay has been interrupted, the interruption may be cancelled, and the process may proceed to Step S4 to return to an ordinary state in which the wake-up request signal W1 is transmitted.

If it is not determined in Step S21 that the vehicle 100 is estimated to be activated (Step S21: NO), the process may proceed to Step S22 in which it is determined whether the wake-up request signal W1 has continuity. In this example, it may be determined that the wake-up request signal W1 has continuity (Step S22: YES) if the same wake-up request signal W1 is continuously transmitted from one of the ECUs 2. If it is not determined that the wake-up request signal W1 has continuity (Step S22: NO), the process may proceed to Step S4 in which the wake-up request signal W1 is transmitted without interrupting the relaying of the wake-up request signal W1.

If it is determined in Step S22 that the wake-up request signal W1 has continuity (Step S22: YES), a real-time clock (RTC) in the CPU 31 may start counting time in Step S23. The RTC may measure an elapsed time from the time when the wake-up request signal W1 starts being continuously transmitted. If the measured time is longer than a predetermined time Ta (Step S24: YES), the relaying of the wake-up request signal W1 may be interrupted (Step S3). If the measured time is shorter than or equal to the predetermined time Ta (Step S24: NO), the process may proceed to Step S4 in which the wake-up request signal W1 is transmitted without interrupting the relaying of the wake-up request signal W1.

According to the process performed by the wake-up request relay 31W described above, in a case where the same wake-up request signal W1 is continuously transmitted from one of the ECUs 2 for longer than the predetermined time Ta as illustrated in FIG. 3, the gateway device 3 may stop relaying the wake-up request signal W1 to another one of the ECUs 2 regardless of whether wake-up data includes an error. This prevents the battery 4 from being exhausted in a case where the wake-up request signal W1 is continuously transmitted.

According to the vehicle communication system 1 having the above-described features, even if a situation arises in which the wake-up request signal is continuously transmitted from one of the ECUs 2, it is possible to reduce unnecessary electric power consumption without excessively increasing the processing capacity of the gateway device 3.

In the foregoing example, the wake-up request signal W1 may be transmitted from one of the ECUs 2. However, the gateway device 3 may wake up itself when receiving a signal of any type (e.g., a CAN signal) transmitted through any of the communication lines L and transmit the wake-up request signal W1 to one or more of the ECUs 2 to be woken up. Also in this case, in a case where it is determined in view of electric power consumption of the battery that the transmission of the wake-up request signal W1 is unacceptable, the gateway device 3 refrains from transmitting the wake-up request signal W1. Accordingly, it is possible to reduce unnecessary electric power consumption without excessively increasing the processing capacity of the gateway device 3 as in the case described above.

Although some example embodiments of the disclosure have been described in the foregoing by way of example with reference to the accompanying drawings, specific configurations of the disclosure are by no means limited to the example embodiments described above. It should be appreciated that modifications and alterations may be made without departing from the scope as defined by the appended claims. The disclosure is intended to include such modifications and alterations in so far as they fall within the scope of the appended claims or the equivalents thereof. Further, the foregoing example embodiments may be combined with each other as long as there are no particular contradictions or problems in their purposes and configurations.

The invention claimed is:
1. A vehicle communication system comprising:
a gateway device (1) coupled to a first communication line and a second communication line different from the first communication line, and (2) configured to relay communication between the first communication line and the second communication line, the first communication line being coupled to a first electronic control unit (ECU), the second communication line being coupled to a second ECU, the second communication line being not coupled to the first communication line directly, the first and second ECUs being disposed on a vehicle and being configured to perform functions of the vehicle, wherein the gateway device is configured to:
receive electric power from a battery of the vehicle;
receive a first signal to wake-up the second ECU through the first communication line;
when the gateway device is in stand-by mode, upon receiving the first signal, i) initiate a wake-up operation on the gateway device itself and ii) determine whether the first signal is sent from the first ECU;
in response to determining that the first signal is sent from the first ECU, transmit a second signal to the second ECU through the second communication line, the second signal being to wake up the second ECU; and
in response to determining that the first signal is not sent from the first ECU:

determine whether transmission of the second signal is unacceptable or acceptable based on continuity of the first signal received through the first communication line;

in response to determining that the transmission of the second signal is unacceptable, refrain from transmitting the second signal; and in response to determining that the transmission of the second signal is acceptable, transmit the second signal.

2. The vehicle communication system according to claim 1, wherein the gateway device is further configured to:

determine whether an elapsed time from a time when the first signal starts being continuously received is longer than a predetermined time;

in response to determining that the elapsed time is not longer than the predetermined time, determine that the transmission of the second signal is acceptable; and in response to determining that the elapsed time is longer than the predetermined time, determine that the transmission of the second signal is unacceptable.

3. The vehicle communication system according to claim 1, wherein the gateway device is further configured to:

coupled to a third communication line different from the first and second communication lines, the third communication line being not coupled to the first and second communication lines directly;

when the gateway device is in the stand-by mode, upon receiving the first signal via the first communication line or the third communication line, (1) initiate the wake-up operation on the gateway device itself and (2) determine whether the first signal is transmitted from the first ECU;

in response to determining that the received wake-up signal is transmitted from the first ECU, transmit the second signal to the second ECU through the second communication line;

in response to determining that the first signal is not transmitted from the first ECU, determine whether the transmission of the second signal is unacceptable or acceptable based on continuity of the first signal received through the first communication line or the third communication line;

in response to determining that the transmission of the second signal is unacceptable, refrain from transmitting the second signal to the second communication line; and in response to determining that the transmission of the second signal is acceptable, transmit the second signal to the second communication line.

4. The vehicle communication system according to claim 3, wherein the gateway device is further configured to:

determine whether an elapsed time from a time when the first signal starts being continuously received is longer than a predetermined time;

in response to determining that the elapsed time is not longer than the predetermined time, determine that the transmission of the second signal is acceptable; and in response to determining that the elapsed time is longer than the predetermined time, determine that the transmission of the second signal is unacceptable.

5. The vehicle communication system according to claim 2, wherein the first ECU includes an ECU that transmits the first signal when a vehicle start switch of the vehicle is turned on, and wherein the second communication line is not directly coupled to an ECU that transmits the first signal when the start switch is turned on.

6. The vehicle communication system according to claim 4, wherein the first ECU includes an ECU that transmits the first signal when a vehicle start switch of the vehicle is turned on, and wherein each of the second and third communication lines is not directly coupled to an ECU that transmits the first signal when the start switch is turned on.

7. The vehicle communication system according to claim 2, wherein the first ECU includes an ECU that transmits the first signal when a driver door of the vehicle is opened, and wherein the second communication line is not directly coupled to an ECU that transmits the first signal when a driver door of the vehicle is opened.

8. The vehicle communication system according to claim 4, wherein the first ECU includes an ECU that transmits the first signal when a driver door of the vehicle is opened, and wherein each of the second and third communication lines is not directly coupled to an ECU that transmits the first signal when a driver door of the vehicle is opened.

9. The vehicle communication system according to claim 1, wherein the first ECU includes an ECU that transmits the first signal when detecting an occupant seated on a driver's seat of the vehicle, and wherein the second communication line is not directly coupled to the ECU that transmits the first signal when detecting an occupant seated on a driver's seat of the vehicle.

10. The vehicle communication system according to claim 4, wherein the first ECU includes an ECU that transmits the first signal when detecting an occupant seated on a driver's seat of the vehicle, and wherein each of the second and third communication lines is not directly coupled to the ECU that transmits the first signal when detecting an occupant seated on a driver's seat of the vehicle.

11. A vehicle comprising:

a first electronic control unit (ECU);

a second ECU different from the first ECU;

a first communication line coupled to the first ECU;

a second communication line coupled to the second ECU, the second communication line being different from the first communication line and not coupled to the first communication line directly;

a battery configured to supply electric power to the first ECU and the second ECU;

a gateway device (1) coupled to the first communication line and the second communication line, and (2) configured to:

receive the electric power from the battery;

relay communication between the first communication line and the second communication line;

when the gateway device is in stand-by mode, upon receiving a wake-up signal to wake up the second ECU via the first communication line, (1) wake up the gateway device from the stand-by mode, and (2) determine whether the received wake-up signal is transmitted from the first ECU;

in response to determining that the received wake-up signal is transmitted from the first ECU, relay the received wake-up signal to the second communication line;

in response to determining that the received wake-up signal is not transmitted from the first ECU, determine whether relaying of the received wake-up signal to the second communication line is unacceptable or acceptable based on continuity of the wake-up signal received via the first communication line;

in response to determining that the relaying of the received wake-up signal is unacceptable, refrain from relaying the received wake-up signal to the second communication line; and in response to determining that the relaying of the received wake-up signal is acceptable, relay the received wake-up signal to the second communication line.

12. The vehicle according to claim 11, further comprising a third communication line coupled to the gateway device and different from the first and second communication lines, the third communication line being not coupled to the first and second communication lines directly, wherein the gateway device is further configured to:

relay communication between the first and second communication lines and the third communication line;

when the gateway device is in the stand-by mode, upon receiving the wake-up signal via the first communication line or the third communication line, (1) wake up the gateway device from the stand-by mode, and (2) determine whether the received wake-up signal is transmitted from the first ECU;

in response to determining that the received wake-up signal is transmitted from the first ECU, relay the received wake-up signal to the second communication line;

in response to determining that the received wake-up signal is not transmitted from the first ECU, determine whether relaying of the received wake-up signal to the second communication line is unacceptable or acceptable based on continuity of the wake-up signal received via the first communication line or the third communication line;

in response to determining that the relaying of the received wake-up signal is unacceptable, refrain from relaying the received wake-up signal to the second communication line; and in response to determining that the relaying of the received wake-up signal is acceptable, relay the received wake-up signal to the second communication line.

13. The vehicle according to claim 11, wherein the gateway device is further configured to:

determine whether an elapsed time from a time when the wake-up signal starts being continuously received is longer than a predetermined time;

in response to determining that the elapsed time is not longer than the predetermined time, determine that the relaying of the received wake-up signal to is acceptable; and in response to determining that the elapsed time is longer than the predetermined time, determine that the relaying of the received wake-up signal is unacceptable.

14. The vehicle according to claim 12, wherein the gateway device is further configured to:

determine whether an elapsed time from a time when the wake-up signal starts being continuously received is longer than a predetermined time;

in response to determining that the elapsed time is not longer than the predetermined time, determine that the relaying of the received wake-up signal to is acceptable; and in response to determining that the elapsed time is longer than the predetermined time, determine that the relaying of the received wake-up signal is unacceptable.

15. The vehicle according to claim 13,
wherein the first ECU includes an ECU that transmits the wake-up signal when a vehicle start switch of the vehicle is turned on, and
wherein the second communication line is not directly coupled to an ECU that transmits the wake-up signal when the start switch is turned on.

16. The vehicle according to claim 14,
wherein the first ECU includes an ECU that transmits the wake-up signal when a vehicle start switch of the vehicle is turned on, and
wherein each of the second and third communication lines is not directly coupled to an ECU that transmits the wake-up signal when the start switch is turned on.

17. The vehicle according to claim 13,
wherein the first ECU includes an ECU that transmits the wake-up signal when a driver door of the vehicle is opened, and
wherein the second communication line is not directly coupled to an ECU that transmits the wake-up signal when a driver door of the vehicle is opened.

18. The vehicle according to claim 14,
wherein the first ECU includes an ECU that transmits the wake-up signal when a driver door of the vehicle is opened, and
wherein each of the second and third communication lines is not directly coupled to an ECU that transmits the wake-up signal when a driver door of the vehicle is opened.

19. The vehicle according to claim 13,
wherein the first ECU includes an ECU that transmits the wake-up signal when detecting an occupant seated on a driver's seat of the vehicle, and
wherein the second communication line is not directly coupled to an ECU that transmits the wake-up signal when detecting an occupant seated on a driver's seat of the vehicle.

20. The vehicle according to claim 14,
wherein the first ECU includes an ECU that transmits the wake-up signal when detecting an occupant seated on a driver's seat of the vehicle, and
wherein each of the second and third communication line is not directly coupled to an ECU that transmits the wake-up signal when detecting an occupant seated on a driver's seat of the vehicle.

* * * * *